US012711107B2

(12) United States Patent
Nadagouda et al.

(10) Patent No.: US 12,711,107 B2
(45) Date of Patent: Aug. 18, 2026

(54) VIRTUAL ROOT DIRECTORY FOR ORGANIZATIONS

(71) Applicant: Dropbox, Inc., San Francisco, CA (US)

(72) Inventors: Pratik Nadagouda, Renton, WA (US); Austin Willis, San Francisco, CA (US); Frank Wang, Sammamish, WA (US); Yufei Zou, San Jose, CA (US); Jessica Miao, Vancouver (CA); Kashif Nadeem, Dix Hills, NY (US); Owen Collins, Kitchener (CA); Bozhen Lyu, San Mateo, CA (US); Ken Park, Orinda, CA (US); Jay Paroline, San Francisco, CA (US); Akos Albert, Denver, CO (US)

(73) Assignee: Dropbox, Inc., San Francisco, CA (US)

( * ) Notice: Subject to any disclaimer, the term of this patent is extended or adjusted under 35 U.S.C. 154(b) by 61 days.

(21) Appl. No.: 18/764,729

(22) Filed: Jul. 5, 2024

(65) Prior Publication Data

US 2026/0010518 A1 Jan. 8, 2026

(51) Int. Cl.
*G06F 16/188* (2019.01)
*G06F 21/62* (2013.01)

(52) U.S. Cl.
CPC ........ *G06F 16/192* (2019.01); *G06F 21/6218* (2013.01)

(58) Field of Classification Search
USPC ............................................................ 726/28
See application file for complete search history.

(56) References Cited

U.S. PATENT DOCUMENTS

| | | | |
|---|---|---|---|
| 6,513,038 B1 | 1/2003 | Hasegawa et al. |
| 6,519,612 B1 | 2/2003 | Howard et al. |
| 8,606,760 B2 | 12/2013 | Wahlert et al. |
| 8,751,604 B2 | 6/2014 | Liebman |
| 10,048,949 B2 | 8/2018 | Pletter et al. |

(Continued)

FOREIGN PATENT DOCUMENTS

WO 2022103882 A1 5/2022

OTHER PUBLICATIONS

Pietri A., et al., "Forking Without Clicking: on How to Identify Software Repository Forks," IEEE/ACM 17th International Conference on Mining Software Repositories (MSR), May 25-26, 2020, pp. 277-287, DOI: 10.1145/3379597.3387450.

*Primary Examiner* — Brandon Hoffman
(74) *Attorney, Agent, or Firm* — Keller Preece PLLC

(57) ABSTRACT

The present technology provides a versatile content management system that can also support bi-directional synchronization of an organization account. The organization account is maintained as a plurality of root directories that can be mounted under an organization directory top-level folder. The organization directory top-level folder can appear in a user account's view of the organization account, by does not actually exist as a directory in the content management system. The organization directory top-level folder can be a folder created on a client device in which root directories of an organization account are mounted, but the organization directory top-level folder is not a synchronized directory. The organization directory top-level folder gives the appearance of a single directory structure for an organization even though the organization content is actually organized into the plurality of root directories.

20 Claims, 11 Drawing Sheets

CONTENT MANAGEMENT SYSTEM 102
306 User Account 1
308 User Account 2
310 Finance
312 Sales
314 HR
Membership Database 304
Access Control List 128

USER 1 CLIENT SYNCHRONIZATION SERVICE INSTANCE

USER 2 CLIENT SYNCHRONIZATION SERVICE INSTANCE

(56) References Cited

U.S. PATENT DOCUMENTS

| | | | | |
|---|---|---|---|---|
| 10,530,742 | B2 | 1/2020 | Shah et al. | |
| 11,443,380 | B2 | 9/2022 | Cummings | |
| 11,580,241 | B2 | 2/2023 | Von Muhlen et al. | |
| 11,757,940 | B2 | 9/2023 | Vaidya et al. | |
| 11,824,646 | B1 | 11/2023 | Muddu et al. | |
| 2011/0264718 | A1* | 10/2011 | Chen | G06F 21/629 707/831 |
| 2018/0137291 | A1* | 5/2018 | Ho | G06F 21/602 |

* cited by examiner

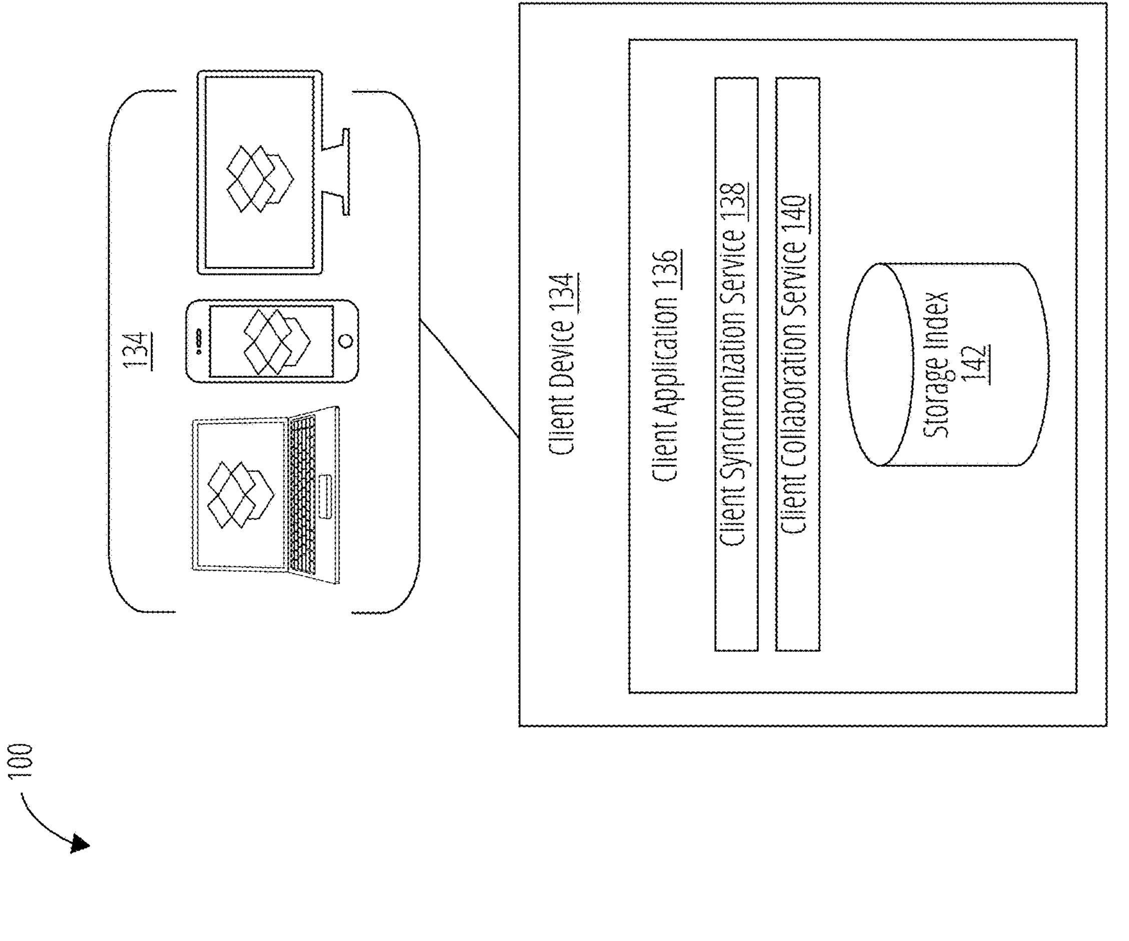
FIG. 1
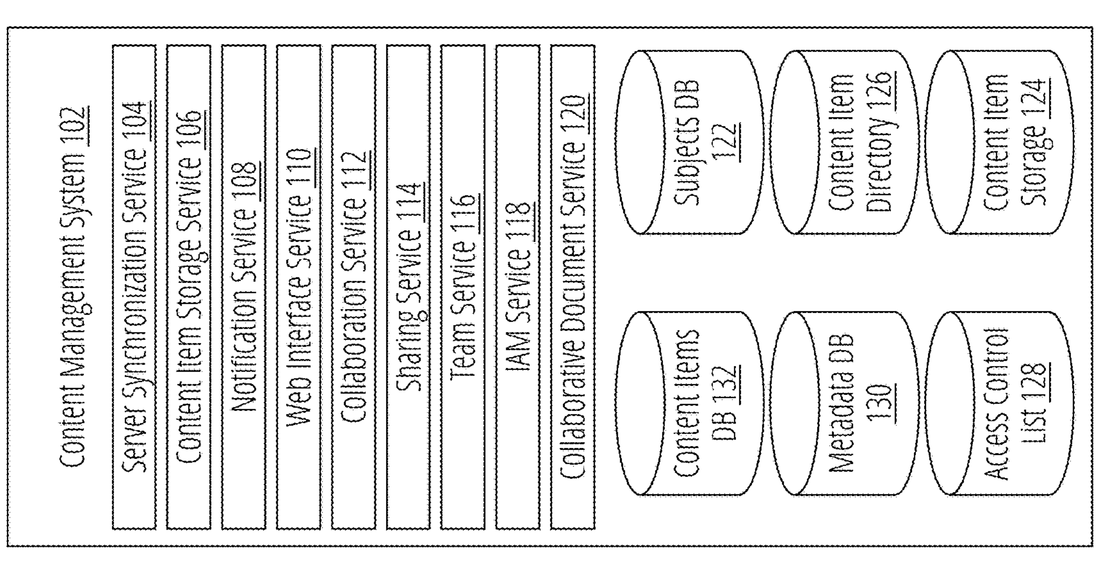

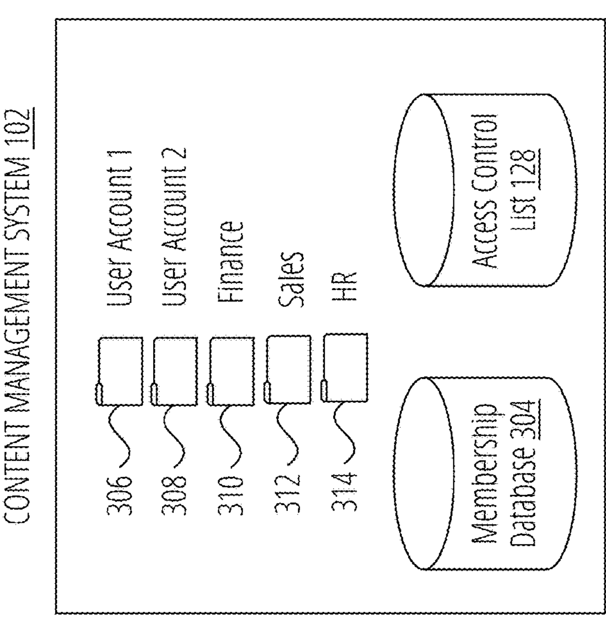
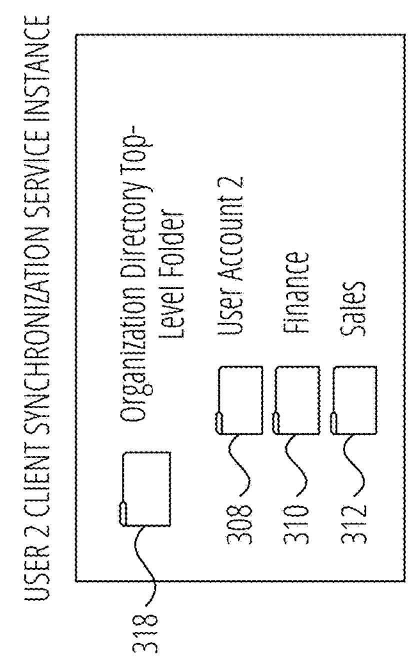
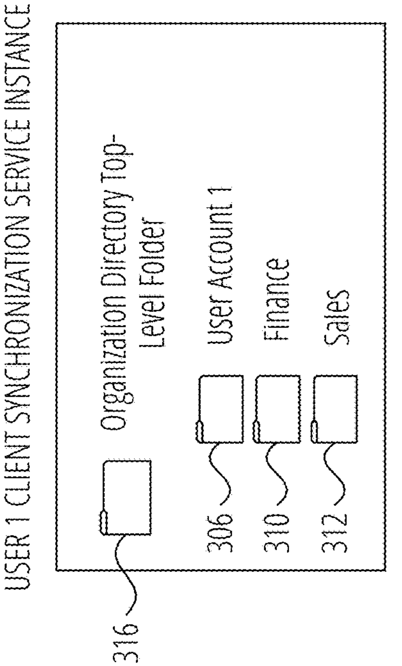
FIG. 3

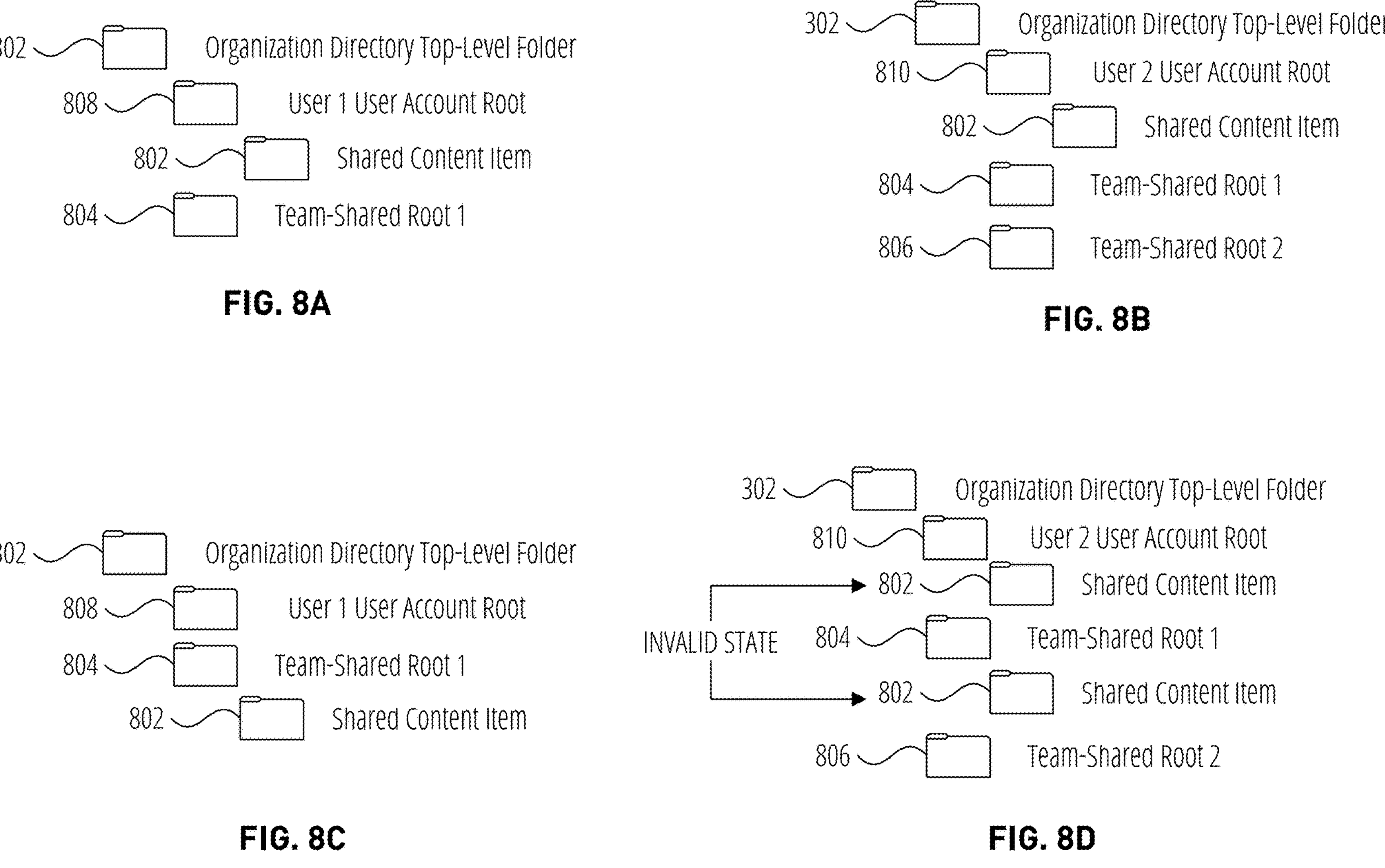
302
Organization Directory Top-Level Folder
808
User 1 User Account Root
802
Shared Content Item
804
Team-Shared Root 1
FIG. 8A
302
Organization Directory Top-Level Folder
810
User 2 User Account Root
802
Shared Content Item
804
Team-Shared Root 1
806
Team-Shared Root 2
FIG. 8B
302
Organization Directory Top-Level Folder
808
User 1 User Account Root
804
Team-Shared Root 1
802
Shared Content Item
FIG. 8C
302
Organization Directory Top-Level Folder
810
User 2 User Account Root
INVALID STATE
802
Shared Content Item
804
Team-Shared Root 1
802
Shared Content Item
806
Team-Shared Root 2
FIG. 8D

FIG. 9

VIRTUAL ROOT DIRECTORY FOR ORGANIZATIONS

BACKGROUND

Content Management Systems provide a centralized platform for storing, organizing, and sharing content, and allow users across departments to access a common directory structure within an organization. This unified approach enables seamless collaboration, reduces information silos, and fosters transparency by giving every user a clear understanding of where specific files and folders reside. With everyone having access to the same directory structure, organizations can ensure that critical documents are easily located, updated, and shared across teams, departments, or even locations.

Modern content management systems also make content items more accessible to user accounts within an organization by providing access to the organization's content management system using client devices from anywhere in the world.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 1 illustrates an example of a content management system and client devices in accordance with some aspects of the present technology.

FIG. 3 illustrates a high-level system view showing a plurality of root directories at a content management system, and showing how the plurality of root directories manifest at client devices of two respective user accounts in accordance with some embodiments of the present technology.

FIG. 8A, FIG. 8B, FIG. 8C, and FIG. 8D illustrate a scenario in which a duplicate mount is possible in accordance with some embodiments of the present technology.

FIG. 9 illustrates an example routine for providing a traversal right to a user account to access a content item under a team-shared root to which they do not have access in accordance with some embodiments of the present technology.

DETAILED DESCRIPTION

Figure 2A:
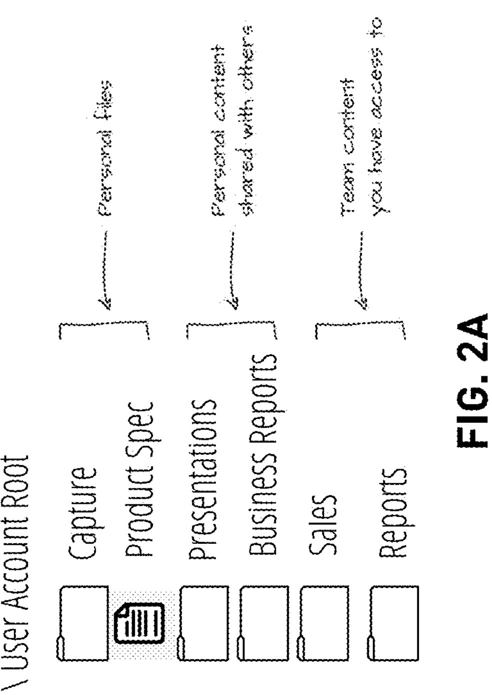
FIG. 2A, FIG. 2B, and FIG. 2C illustrate different models by which a content management system can organize shared organizational content in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Content Management Systems provide a centralized platform for storing, organizing, and sharing content, and allow users across departments to access a common directory structure within an organization. This unified approach enables seamless collaboration, reduces information silos, and fosters transparency by giving every user a clear understanding of where specific files and folders reside. With everyone having access to the same directory structure, organizations can ensure that critical documents are easily located, updated, and shared across teams, departments, or even locations.

Modern content management systems also make content items more accessible to user accounts within an organization by providing access to the organization's content management system using client devices from anywhere in the world.

However, users and organizations now require their content management systems to support more complex behaviors, which can make providing access through a common directory structure more complicated. For example, it has long been the case that if a user account needed access to a content item within the content management system that the user account should be given access to the directory or folder which contained that content item. This is simple enough in the general sense, but becomes more complicated when the directory should otherwise be confidential with respect to that user account. Over time, content management systems have come up with various solutions to this challenge, for example, but even these solutions were not flexible enough to account for all desired use cases. Today, content management systems utilize a lot of complex logic, which can reduce the performance of content management systems.

All of these challenges are magnified in content management systems that support bi-directional synchronization. Such content management systems, also need to support a high volume of synchronization operations, and for organizations that have more than a few dozen user accounts, the volume of synchronization actions coupled with the complex and varied use cases that these content management systems need to support can result in a non-performant content management system.

The present technology attempts to address these issues by providing a versatile content management system that can also support bi-directional synchronization. The present technology can achieve these aims by breaking apart an organization account into a plurality of smaller accounts, or root directories. Breaking the organization account into these root directories simplifies the synchronization load, by reducing the size of a directory tree that a synchronization engine must traverse to bring the directory tree up-to-date. While it is true that there are now more root directories—there used to be just one for an organization and now there are several to dozens—not every member of an organization needs to have every root directory mounted to their view of the organization account. For example, if a user account cannot access a human resources root directory, there is no reason to mount the human resources root directory to that account, and thereby, synchronization accounts for that user account will not need to be evaluated for impact to the human resources root directory.

While breaking the organization account into a plurality of root directories solves the impracticality of synchronizing a single root directory for a large organization, it does not, by itself result in a desired characteristic of an organization account of providing a common directory structure within the organization. To achieve this aim, the present technology utilizes a virtual root directory. A virtual root directory is an organization directory top-level folder, that can appear in a user account's view of the organization account, by does not actually exist as a directory in the content management system. The organization directory top-level folder can be a folder created on a client device in which root directories of an organization account are mounted, but the organization directory top-level folder is not a synchronized directory.

While the organization directory top-level folder is present and tracked in the content management system, it does not directly contain content items. This is why is a virtual directory. The organization directory top-level folder is not a true directory because, from the content management system's perspective, it does not have content items directly under it. However, the content management system can mount other root directories associated with the organization account under the organization directory top-level folder.

The organization directory top-level folder is associated with policies that make it read-only, except to the content management system, which can mount another root directory under the organization directory top-level folder. The root directories associated with the organization account are mounted under the organization directory top-level folder separately for each user account associated with the organization account. In this way, the organization directory top-level folder contains a user account view of an organization account.

Any view of the organization directory top-level folder that has root directories mounted underneath it, is a view for that specific user account.

Since the organization directory top-level folder is a virtual directory, it is not visible in the admin console for administrators associated with the organization account. Administrators can see root directories associated with the organization account, and administrators can add new root directories to be associated with the organization account. Any root directories associated with the organization account can be mounted under a user account's view of the organization directory top-level folder.

Since the content management system can mount other root directories under the organization directory top-level folder, the organization directory top-level folder can look like a directory, especially as it is manifested on a client device, however one distinction is that changes to content items only affect the root that they are stored under. Therefore, any content item that appears to be under the organization directory top-level folder (because the root that actually contains the content item is mounted under the organization directory top-level folder) does not cause synchronization actions that affect the organization directory top-level folder. Any synchronization actions stop at the root directory that contains the content item.

Yet, the organization directory top-level folder still is associated with some management by the content management system, else user accounts of the organization might store additional content items within that folder expecting that content to be made available to the whole organization, and this behavior would not be desirable.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments, the disclosed technology is deployed in the context of a content management system having content item synchronization capabilities and collaboration features, among others. An example system configuration 100 is shown in FIG. 1, which depicts content management system 102 interacting with client device 134.

Accounts

Content management system 102 can store content items in association with accounts, as well as perform a variety of content item management tasks, such as retrieve, modify, browse, and/or share the content item(s). Furthermore, content management system 102 can enable an account to access content item(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g. various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of content items while an engineering group can have access to another set of content items. An administrator group can modify groups, modify subject accounts, etc. Groups are also subjects identified by subject ID.

In some embodiments, subject database 122 can be broken into a plurality of tables, indexes and other data structures.

Content Item Storage

A feature of content management system 102 is the storage of content items, which can be stored in content item storage 124. An object generally is any entity that can be recorded in a file system. Objects can be any object including digital data such as documents, collaboration objects, text files, audio files, image files, video files, webpages, executable files, binary files, content item directories, folders, zip files, playlists, albums, symlinks, cloud docs, mounts, placeholder objects referencing other objects in content management system 102 or in other content management systems, etc.

In some embodiments, content items can be grouped into a collection, which can refer to a folder including a plurality of content items, or a plurality of content items that are related or grouped by a common attribute.

In some embodiments, content item storage 124 is combined with other types of storage or databases to handle specific functions. Content item storage 124 can store objects, while metadata regarding the objects can be stored in metadata database 130. Likewise, data regarding where an object is stored in content item storage 124 can be stored in content item directory 126. Additionally, data regarding changes, access, etc. can be stored in content items database 132. Content items database 132 can also include a subject account identifier that identifies the subject IDs that have access to the object.

In some embodiments, content items database 132 can be broken into a plurality of tables, indexes and other data structures.

Each of the various storages/databases such as content item storage 124, content item directory 126, content items database 132, and metadata database 130 can be comprised of more than one such storage or database and can be distributed over many devices and locations. Other configurations are also possible. For example, data from content item storage 124, content item directory 126, content items database 132, and/or metadata database 130 may be combined into one or more content item storages or databases or further segmented into additional content item storages or databases. Thus, content management system 102 may include more or less storages and/or databases than shown in FIG. 1.

In some embodiments, content item storage 124 is associated with at least one content item storage service 106, which includes software or other processor executable instructions for managing the storage of content items including, but not limited to, receiving content items for storage, preparing content items for storage, selecting a storage location for the content item, retrieving content items from storage, etc. In some embodiments, content item storage service 106 can divide an object into smaller chunks for storage at content item storage 124. The location of each chunk making up an object can be recorded in content item directory 126. Content item directory 126 can include a content entry for each object stored in content item storage 124. The content entry can be associated with an object ID, which uniquely identifies an object.

In some embodiments, each content item and each chunk of a content item can also be identified from a deterministic hash function. This method of identifying a content item and chunks of content items can ensure that content item duplicates are recognized as such since the deterministic hash function will output the same hash for every copy of the same content item, but will output a different hash for a different content item. Using this methodology, content item storage service 106 can output a unique hash for each different version of an object.

Content item storage service 106 can also designate or record a parent of a content item or a content path for a content item in content items database 132. The content path can include the name of the object and/or folder hierarchy associated with the object. For example, the content path can include a folder or path of folders in which the object is stored in a local file system on a client device. In some embodiments, content item database might only store a direct ancestor or direct child of any object, which allows a full path for an object to be derived, and can be more efficient than storing the whole path for an object.

While content items are stored in content item storage 124 in blocks and may not be stored under a tree like directory structure, such directory structure is a comfortable navigation structure for subjects viewing content items. Content item storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in content item storage 124.

While the directory structure in which an account views content items does not correlate to storage locations of the content items at content management system 102, the directory structure can correlate to storage locations of the content items on client device 134 depending on the file system used by client device 134.

As addressed above, a content entry in content item directory 126 can also include the location of each chunk making up a content item. More specifically, the content entry can include content pointers that identify the location in content item storage 124 of the chunks that make up the object.

Content item storage service 106 can decrease the amount of storage space required by identifying duplicate content items or duplicate blocks that make up a content item or versions of a content item. Instead of storing multiple copies, content item storage 124 can store a single copy of the content item or block of the content item, and content item directory 126 can include a pointer or other mechanism to link the duplicates to the single copy.

Content item storage service 106 can also store metadata describing content items, content item types, folders, file path, and/or the relationship of content items to various accounts, collections, or groups in metadata database 130, in association with the content item ID of the content item.

Content item storage service 106 can also store a log of data regarding changes, access, etc. in content items database 132. Content items database 132 can include the object ID of the object and can optionally include a description of the change or access action along with a time stamp or version number and any other relevant data. Content items database 132 can also include pointers to blocks affected by the change or object access. Content item storage service 106 can also provide the ability to undo operations, by using an object version control mechanism that tracks changes to objects, different versions of objects (including diverging version trees), and a change history that can be acquired from content items database 132.

Content Item Synchronization

Another feature of content management system 102 is synchronization of content items with at least one client device 134. Client devices 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client device 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client device 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to content items between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved content items) to content items in a designated location of a file system of client device 134.

Content items can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content item storage service 106. In some embodiments, client synchronization service 138 can perform some functions of content item storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the content items within client storage with content items associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Content item storage service 106 can store the changed or new block for the object and update content items database 132, metadata database 130, content item directory 126, content item storage 124, subject database 122, etc. as appropriate.

When synchronizing from content management system 102 to client device 134, data regarding a mount, modification, addition, deletion, move of a content item recorded in content items database 132 can trigger a notification to be sent to client device 134 using notification service 108. When client device 134 is informed of the change, client device 134 can make a request for changes listed in content items database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service 138 can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for content item changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the content items associated with the particular subject account on content management system 102. Selectively synchronizing only some of the content items can preserve space on client device 134 and save bandwidth.

In some embodiments, client synchronization service 138 selectively stores a portion of the content items associated with the particular subject account and stores placeholder content items in client storage for the remainder portion of the content items. For example, client synchronization service 138 can store a placeholder content item that has the same filename, path, extension, metadata, of its respective complete content item on content management system 102, but lacking the data of the complete content item. The placeholder content item can be a few bytes or less in size while the respective complete content item might be significantly larger. After client device 134 attempts to access the content item, client synchronization service 138 can retrieve the data of the content item from content management system 102 and provide the complete content item to client device 134. This approach can provide significant space and bandwidth savings while still providing full access to a subject's content items on content management system 102.

While the synchronization embodiments addressed above referred to client device 134 and a server of content management system 102, it should be appreciated by those of ordinary skill in the art that a user account can have any number of client devices 134 all synchronizing content items with content management system 102, such that changes to a content item on any one client device 134 can propagate to other client devices 134 through their respective synchronization with content management system 102.

Collaboration Features

Another feature of content management system 102 is to facilitate collaboration between subjects. Collaboration features include content item sharing, commenting on content items, co-working on content items in real time, instant messaging, providing presence and "seen" state information regarding content items, etc.

Sharing

Content management system 102 can manage sharing content items via sharing service 114. Sharing a content item by providing a link to the content item can include making the content item accessible from any computing device in network communication with content management system 102. However, in some embodiments a link can be associated with access restrictions enforced by content management system 102 and Identity and Access Management service (IAM service) 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share a content item within content management system 102, sharing service 114 can add associate a subject ID of a team or of one or more subject accounts with a content item in content items database 132 associated with the content item, thus granting the added subject account(s) access to the content item. Sharing service 114 can also remove subject IDs from being permitted to access a content item in content items database 132 to restrict a subject account's access to the content item. Sharing service 114 can record object identifiers, subject identifiers given access to an object, and access levels in content items database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective content item. An access control list for any respective object in content management system can be derived from content items database 132. In some embodiments, it is not desirable to maintain a persistent access control list 128 for a respective object, as an access control list 128 for a respective object can be derived when needed. In some embodiments, objects can inherit access rights from another object such as ancestor objects.

To share content items outside of content management system 102, sharing service 114 can generate a custom network address, such as a uniform resource locator (URL), which allows any web browser to access the content item or collection in content management system 102 without any authentication. To accomplish this, sharing service 114 can include content identification data in the generated URL, which can later be used to properly identify and return the requested content item. For example, sharing service 114 can include a token identifying a content item ID and optionally a subject ID in the generated URL. Upon selection of the URL, the content identification data included in the URL can be transmitted to content management system 102, which can use the received content identification data to identify the appropriate content item and return the content item.

In addition to generating the URL, sharing service 114 can also be configured to record in content items database 132 that a URL to the content item has been created. In some embodiments, an entry into content items database 132 associated with a content item can include a URL flag indicating whether a URL to the content item has been created. For example, the URL flag can be a Boolean value initially set to 0 or false to indicate that a URL to the content item has not been created. Sharing service 114 can change the value of the flag to 1 or true after generating a URL to the content item.

In some embodiments, sharing service 114 can associate a set of permissions to a URL for a content item. For example, if a subject attempts to access the content item via the URL, sharing service 114 can provide a limited set of permissions for the content item. Examples of limited permissions include restrictions that the subject cannot download the content item, save the content item, copy the content item, modify the content item, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into content items database 132 can also include a URL active flag indicating whether the content should be returned in response to a request from the generated URL. For example, sharing service 114 can only return a content item requested by a generated link if the URL active flag is set to 1 or true. Thus, access to a content item for which a URL has been generated can be easily restricted by changing the value of the URL active flag. This allows a subject to restrict access to the shared content item without having to move the content item or delete the generated URL. Likewise, sharing service 114 can reactivate the URL by again changing the value of the URL active flag to 1 or true. A subject can thus easily restore access to the content item without the need to generate a new URL.

In some embodiments, content management system 102 can designate a URL for uploading a content item. For example, a first subject with a subject account can request such a URL, provide the URL to a contributing subject and the contributing subject can upload a content item to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Content Item Access

Content item storage service 106 can receive a token from client application 136 that follows a request to access a content item and can return the capabilities permitted to the subject account.

Presence and Seen State

In some embodiments, content management system 102 can provide information about how subjects with which a content item is shared are interacting or have interacted with the content item. In some embodiments, content management system 102 can report that a subject with which an object is shared is currently viewing the object. For example, client collaboration service 140 can notify notification service 108 when client device 134 is accessing the object. Notification service 108 can then notify all client devices of other subjects having access to the same object of the presence of the subject of client device 134 with respect to the object.

In some embodiments, content management system 102 can report a history of subject interaction with a shared content item. Collaboration service 112 can query data sources such as metadata database 130 and content items database 132 to determine that a subject has saved the content item, that a subject has yet to view the content item, etc., and disseminate this status information using notification service 108 to other subjects so that they can know who currently is or has viewed or modified the content item.

Collaboration service 112 can facilitate comments associated with content, even if a content item does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other content item events can trigger notifications, including deleting a content item, sharing a content item, etc.

Collaboration service 112 can also provide a messaging platform whereby subjects can send and receive instant messages, voice calls, emails, etc.

Collaboration Content Items

In some embodiments content management service can also include collaborative document service 120 which can provide an interactive content item collaboration platform whereby subjects can simultaneously create collaboration content items, comment in the collaboration content items, and manage tasks within the collaboration content items. Collaboration content items can be files that subjects can create and edit using a collaboration content item editor, and can contain collaboration content item elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to a content item being presented on client device 134. In embodiments wherein a content item is accessed by a native application stored and executed on client device 134, where the content item is in a designated location of the file system of client device 134 such that the content item is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access content item storage 124 via an API on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the content item storage 124 made through the web interface, such as uploading a new version of a content item, can be propagated back to other client devices associated with the subject's account. For example, multiple client devices, each with their own client software, can be associated with a single account and content items in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, that resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural system configuration 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural system configuration 100 is simply one possible configuration and that other configurations with more or fewer components are possible.

Figures 2B, 2C:
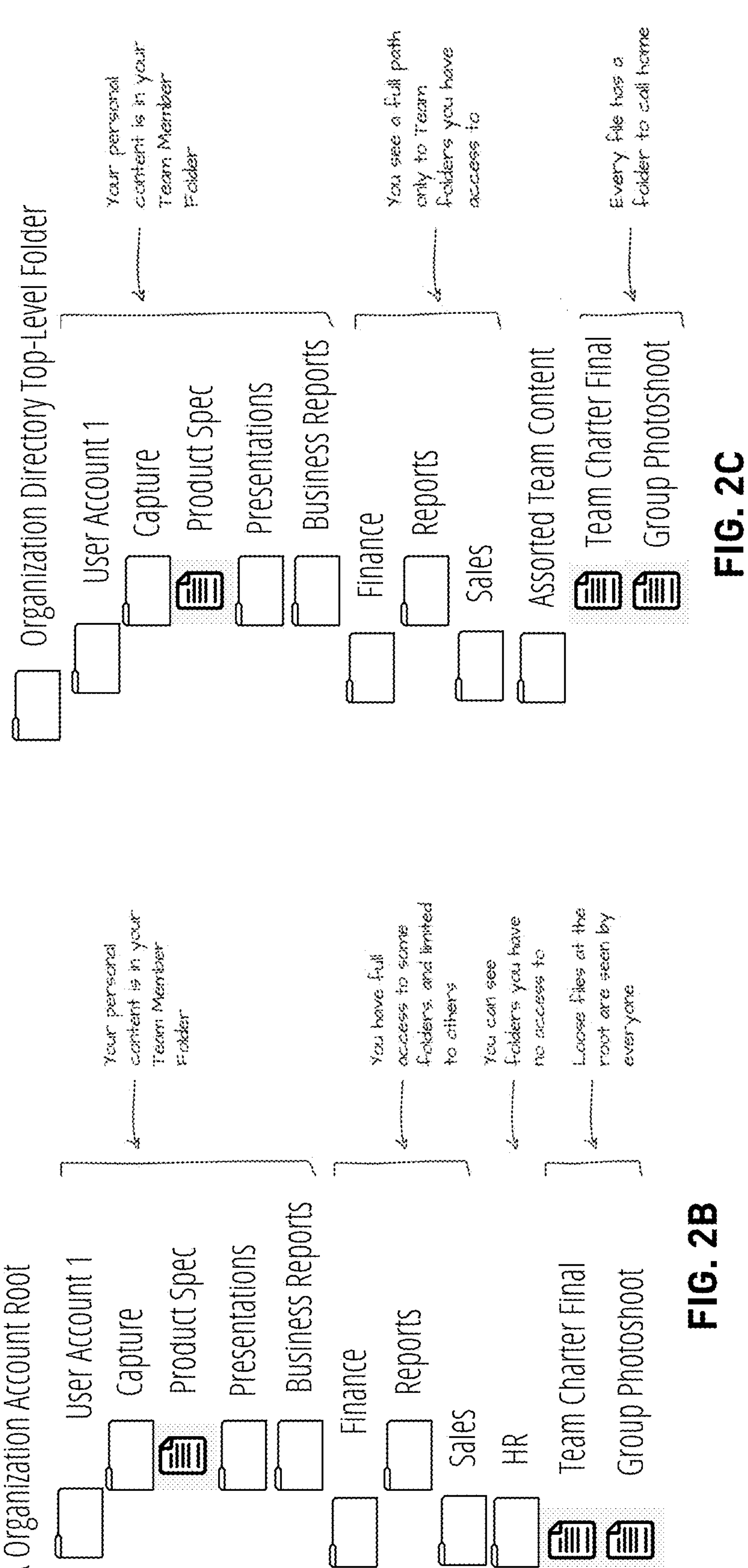

FIG. 2A, FIG. 2B, and FIG. 2C illustrates different models by which a content management system can organize shared organizational content.

FIG. 2A illustrates a paradigm whereby content items are organized by user account. Content items are stored or mounted into a user account root. Thus, user accounts have their respective view. Organizational content is shared with a respective user account, and content items are mounted within the user account root. The folders 'sales' and 'reports' are content items that belong to a user of an organization that have been explicitly shared with the user account. One drawback of this paradigm is that the user account does not see content items in the context of the organization.

FIG. 2B illustrates a paradigm whereby content items are organized by organization account. All content items are stored relative to an organization account root. The main variation in one user account's view compared to another user account's view is that each user account has a personal folder for its contents. This personal folder is mounted under the organization account root and is only viewable to a respective user account. One user account in the organization does not have access to another user account's personal folder. Other than the user account root, each user account associated with the organization account has the same directory view, though respective user accounts might have limited access to some folders. This paradigm achieves the desired effect of providing a consistent organization-wide view of an organization account, but as addressed above, this paradigm suffers from performance challenges in supporting bi-directional synchronization since all content is mounted under a common organization account root and thus the entire root is almost constantly requiring some synchronization operations for teams that number more than several dozen user accounts.

FIG. 2C illustrates a paradigm whereby an organization account is comprised of a plurality of root directories, which are organized into a user account view that gives the appearance of an organization root by mounting the plurality of root directories in an organization directory top-level folder. The organization directory top-level folder is a virtual root directory that can appear in a user account's view of the organization account but does not actually exist as a directory in the content management system. The organization directory top-level folder can be a folder created on a client device in which root directories of an organization account are mounted, but the organization directory top-level folder is not a synchronized directory. Only root directories to which a user account has access are mounted in the user account's view of the organization directory top-level folder, which reduces clutter by not showing directories to which the user account does not have access anyway. And, since the organization directory top-level folder is a virtual folder, synchronization mostly pertains (exceptions are addressed herein) to only the root directory in which a change occurs, which makes bi-directional synchronization significantly more efficient.

The difference in paradigms shown in FIG. 2A, FIG. 2B, and FIG. 2C can be highlighted by addressing a few folders/root directories illustrated therein. FIG. 2A, FIG. 2B, and FIG. 2C illustrates personal content items such as 'capture,' 'product spec,' 'presentations,' and 'business reports.' For the purposes of this illustration, personal content items are not otherwise located within an organization account to which the user account belongs. In FIG. 2A the personal content items are located at the top of the directory, which is the user account root. But in FIG. 2B and FIG. 2C the personal content is located in the user account folder that is mounted under the organization account root (FIG. 2B) or user account root mounted under the organization directory top-level folder (FIG. 2C), which gives the (accurate) impression that the user account is part of the organization. In all paradigms, user account content is generally not accessible to others unless explicitly shared. In FIG. 2A, the user account content is only accessible to the user account, but in FIG. 2B and FIG. 2C the user account could also be accessible by an administrator of an organization account.

Another difference in the paradigms shown in FIG. 2A, FIG. 2B, and FIG. 2C is highlighted by the organization (team) content item 'reports.' In FIG. 2A, 'reports' appears as any other shared content item. The user account has no visual indication that 'reports' belong to the organization or where it is located in a directory structure of the organization. In FIG. 2B and FIG. 2C, 'reports' is shown under a directory structure for the organization, and is shown in a consistent path for all user accounts. The difference between FIG. 2B is that 'reports' is located under 'organization account root/finance', while in FIG. 2C 'reports' is located under 'finance' which appears under the organization directory top-level folder, which again, is a virtual root.

Another difference in the paradigms shown in FIG. 2A, FIG. 2B, and FIG. 2C is highlighted by the organization (team) content item 'HR.' 'HR' is an organization team-shared folder to which the user account does not have access. 'HR' is not visible in FIG. 2A since it was not shared with the user account. 'HR' is visible in FIG. 2B since it is a folder in the organizational directory in FIG. 2B and the user account can see all team-shared folders regardless of their permission to access the team-shared folder. 'HR' is not visible in FIG. 2C because only team-shared roots that the user account has access to are mounted under the organization directory top-level folder.

Another difference is illustrated by comparing FIG. 2B and FIG. 2C. Both figures show organization content items 'team charter final' and 'group photoshoot.' In FIG. 2B, these content items are stored in the organization account root directory, but in FIG. 2C, these content items are stored in a team-shared root 'assorted team content.' This illustrates that although the organization directory top-level folder is in some aspects, just a folder used to give a helpful structure to the plurality of root directories associated with the organization, and the organization directory top-level folder is not a root directory, content management system provides limits what content items can be stored and synchronized in this folder. In some embodiments, only administrators or delegates of administrators can create new team-shared roots, and only team-shared roots can be mounted under the organization directory top-level folder.

FIG. 3 illustrates a high-level system view showing a plurality of root directories at a content management system, and showing how the plurality of root directories manifest at client devices of two respective user accounts in accordance with some embodiments of the present technology.

The content management system 102 maintains a plurality of root directories including user 1 user account root 306, user 2 user account root 308, Finance team-shared root 310, Sales team-shared root 312, HR team-shared root 314. As addressed further herein, these root directories are associated with an organization account and are selectively mounted in association with user accounts associated with the organization account.

Content management system 102 also maintains membership database 304 which associates user accounts and root directories with an organization. For example, the plurality of root directories shown in FIG. 3 could be mapped to a particular organization account. Likewise, the user account for user 1 and the user account for user 2 can be recorded as members of the organization account.

Access control list 128, as addressed with respect to FIG. 1, can include a mapping of respective root directories to user accounts or teams and their access. For example, Finance team-shared root 310 can be mapped to the finance team, and user 1 and user 2 can be members of the finance team. Sales team-shared root 312 can be mapped to the sales team, and user 1 and user 2 can be members of the sales team. HR team-shared root 314 can be mapped to the HR team, but neither user 1 nor user 2 are members of the sales team. In some embodiments, this information can also be derived from the subject database 122.

The information stored at the content management system 102 can be sufficient to construct respective user account views of the organization account by mounting root directories to which a user account has access under an organization directory top-level folder for that user account. For example, user 1 can access their view of the organization directory top-level folder on their client device 134 (in the local directory structure or through a web interface). User 1 can utilize their instance of client synchronization service 138 (or web interface service 110) to create user account 1 organization directory top-level folder 316, and mount user 1 user account root 306, Finance team-shared root 310, and Sales team-shared root 312 under the user account 1 organization directory top-level folder 316. This makes up User 1's user account view of the organization directory. Similarly, User 2 can utilize their instance of client synchronization service 138 (or web interface service 110) to create user account 2 organization directory top-level folder 318, and mount user 2 user account root 308, Finance team-shared root 310, and Sales team-shared root 312 under the user account 2 organization directory top-level folder 318. This makes up User 2's user account view of the organization directory.

Figure 4:
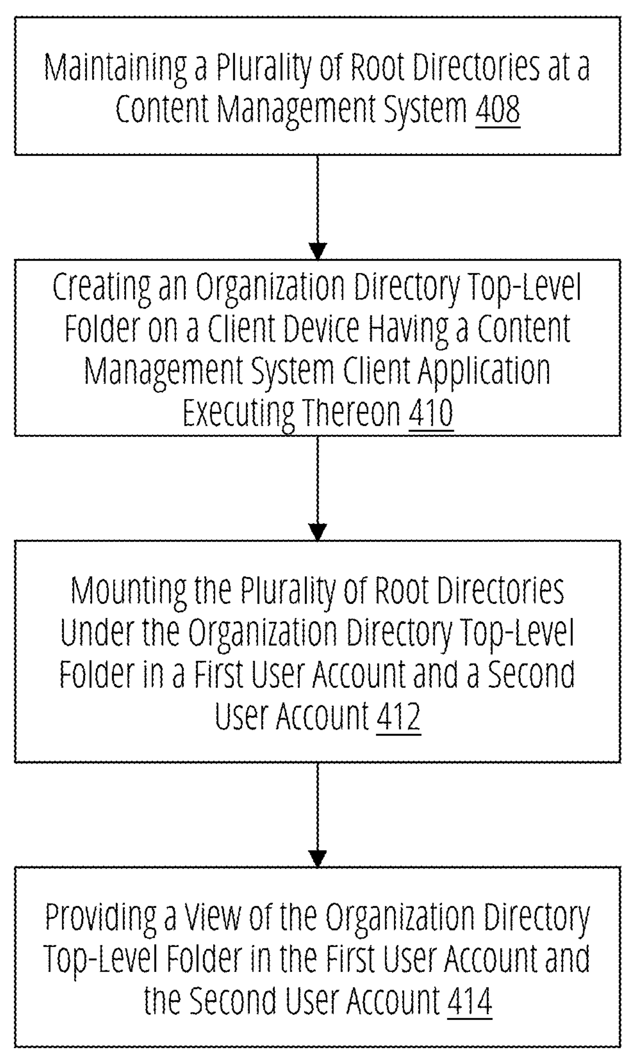
FIG. 4 illustrates an example routine for mounting a plurality of root directories under an organization directory top-level folder in accordance with some embodiments of the present technology.

FIG. 4 illustrates an example routine for mounting a plurality of root directories under an organization directory top-level folder in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As is addressed herein, it is desirable to provide user accounts of an organization with a consistent view of a directory containing the organization's content items, while also supporting bi-directional synchronization for a large number of user accounts. To provide these benefits the present technology maintains an organization account that is comprised of a plurality of root directories, which are organized into a user account view that gives the appearance of an organization root by mounting the plurality of root directories in an organization directory top-level folder. The organization directory top-level folder is a virtual root directory that can appear in a user account's view of the organization account but does not actually exist as a directory in the content management system.

According to some examples, the method includes maintaining a plurality of root directories at a content management system at block 408. For example, the content management system 102 illustrated in FIG. 1 may maintain a plurality of root directories in a content management system. For example, an organization can have an organization account at the content management system 102. The organization account can be associated with a data structure that identifies root directories that are part of the organization account. These root directories can include team-shared roots and user account roots.

The team-shared roots are shared directories to which members of a team within the organization have access. For example, members of the human resources of the organization might have access to a team-shared root that includes content items pertaining to the human resources function of the organization. In another example, members of the engineering team might have access to an engineering team-shared root that might contain content items pertaining to the engineering function of the organization.

User account roots are private directories that are accessible to individual user accounts that are part of the organization account. For example, when a new employee is on-boarded to the organization, an administrator of the organization account can open a new user account associated with the organization. The user account will be associated with a respective user account root. The user account can also be added to various organization teams and thereby be granted access to team-shared roots associated with those teams.

Organization accounts can also associate user accounts with roles. For example, a user account might have a role as a team member and/or as an administrator. Note that the same user account could be associated with both roles, but the user account might not be able to utilize administrator privileges without credential escalation or by accessing a team management interface.

As addressed here, an organization account can also be associated with a construct called an organization directory top-level folder. While the organization directory top-level folder does not exist as a directory in the content management system, the organization account can still create policies to manage the organization directory top-level folder. Such policies can be applied in two main ways. First, since organization directory top-level folder-specific policies can be applied to the behaviors of the root directories themselves by limiting which directories can be added as a root directory of the organization. Any root directory of the organization account is eligible to appear under the organization directory top-level folder. In some embodiments, only a user account with administrator privileges can designate a folder as a root directory for the organization account.

Another way the organization account can manage the organization directory top-level folder is through attributes associated with the organization directory top-level folder that are recorded in a sync tree. Although the organization directory top-level folder is not an actual directory or folder in the content management system, the server synchronization service 104 (illustrated in FIG. 1) can instruct the client synchronization service 138 (also illustrated in FIG. 1) to create the organization directory top-level folder on the client device 134 and mount one or more root directories under the organization directory top-level folder. The client synchronization service 138 can further store an attribute associated with the organization directory top-level folder that makes the organization directory top-level folder read-only. In this way, even if a user account were to try to store a content item under the organization directory top-level folder, the client synchronization service 138 would not synchronize such content.

According to some examples, the method includes creating an organization directory top-level folder on a client device having a content management system client application executing thereon at block 410. For example, the client application client synchronization service 138 illustrated in FIG. 1 may create an organization directory top-level folder on a client device having a content management system client application executing thereon.

According to some examples, the method includes mounting the plurality of root directories under the organization directory top-level folder in a first user account and a second user account at block 412. For example, the client synchronization service 138 illustrated in FIG. 1 may mount the plurality of root directories under the organization directory top-level folder in a first user account and a second user account. As addressed above, the client synchronization service 138 can receive an instruction to create the organization directory top-level folder and can then mount the plurality of root directories under the organization directory top-level folder on the client device. The first user account and the second user account have their own respective views of the organization directory, where, as addressed with respect to FIG. 2C above, the respective user accounts have their user account root appear mounted under the organization directory top-level folder and can have any team-shared root to which the user account has access. For example, the plurality of root directories can include a first user account root, and a second user account root, and the mounting of the plurality of root directories includes mounting the first user account root to the organization directory top-level folder for the first user account, and mounting the second user account root to the organization directory top-level folder for the second user account. Thus, respective user accounts might have different views of the organization account content items, but for any team-shared root to which they have access, all user accounts will see the same directory structure. The respective user account view of the organization directory top-level folder enforces the appearance of a consistent view for any of the team-shared roots displayed in the respective user account view of the organization directory top-level folder.

The second user account root only appears in the organization directory top-level folder for the second user account and does not appear in the organization directory top-level folder for the first user account. The first user account root only appears in the organization directory top-level folder for the first user account and does not appear in the organization directory top-level folder for the second user account.

In some embodiments, the actions associated with block 412 could be performed by web interface service 110 (illustrated in FIG. 1). In instances where a user account is viewed via a web interface or a mobile application, the web interface service 110 can handle the steps that are attributed to the client synchronization service 138—which are applicable to viewing the client account on a personal computer running the client application 136.

Figure 5:
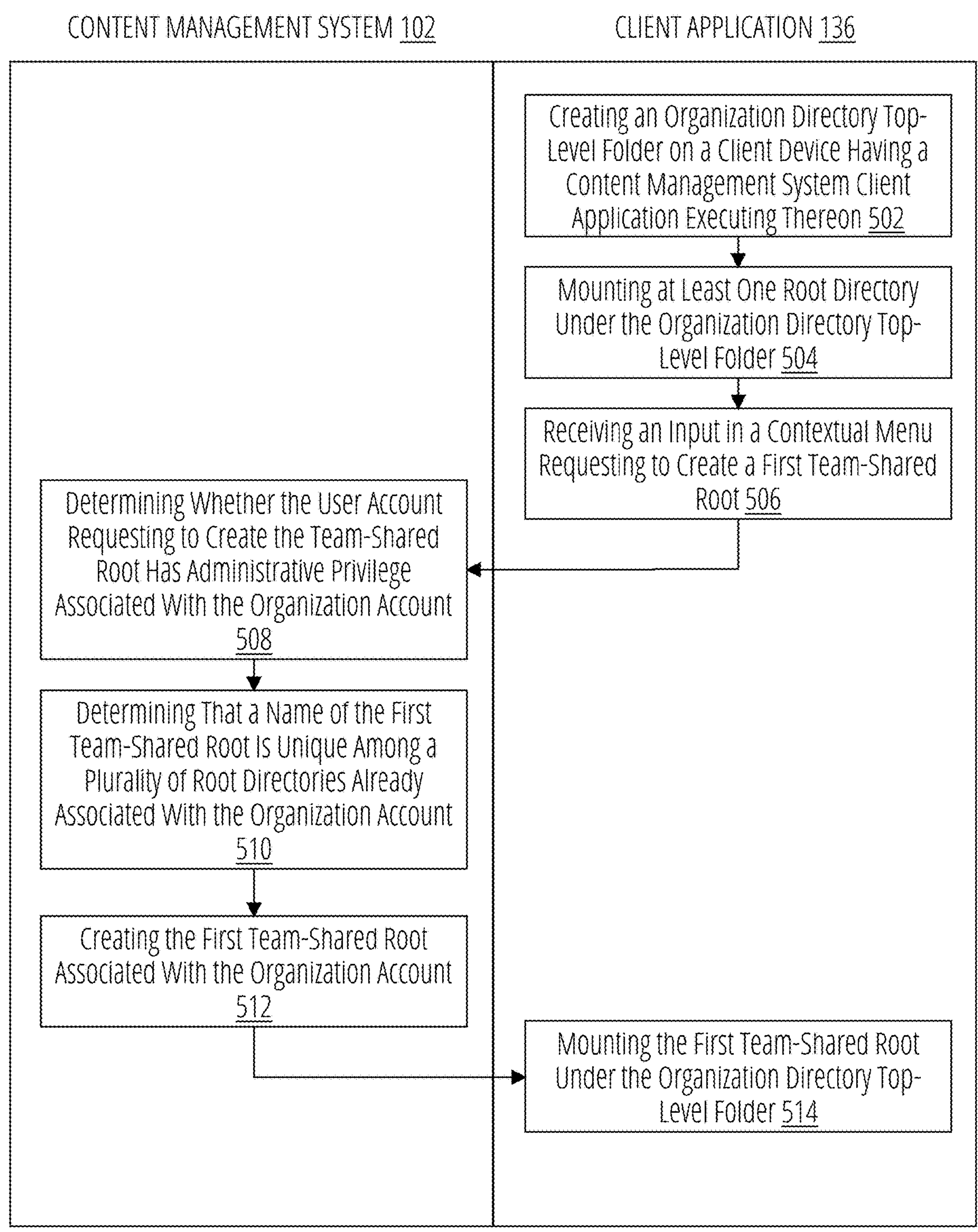
FIG. 5 illustrates an example routine for ensuring that a to-be-created team-shared root has a unique name within the organization account in accordance with some embodiments of the present technology.

According to some examples, the method includes providing a view of the organization directory top-level folder in the first user account and the second user account at block 414. For example, the client device 134 illustrated in FIG. 1 may provide a view of the organization directory top-level folder in the first user account and the second user account. For example, once the client synchronization service 138 creates a local sync tree with the plurality of root directories mounted under the organization directory top-level folder, it can cause the client to present the directory. In some embodiments, this is done by causing a local file system to create folders and displaying those folders in the file explorer of an operating system running on the client device. In some embodiments, this is done by web interface service 110 causing a web browser to display the folders in a web page.

ot has a unique name within the organization account in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. In some embodiments, the method addressed with respect to FIG. 5 is usable with the method addressed with respect to FIG. 4.

There can be several use cases within the context of the present technology that are more complex because the present technology associates a plurality of root directories with an organization account, while those same use cases might be somewhat routine in the context of a traditional directory tree under the same common root. One example is the creation of a new team-shared root.

The creation of a new team-shared root is more complex because, on one hand, the new team-shared root looks like any other root directory, but, on the other hand, team-shared roots are intended to be part of a consistent organization view associated with an organization account, and therefore, it should be expected the new team-shared root will occur in the organization directory top-level folder with other team-shared roots associated with the organization. Since the team-shared roots will be mounted under the organization directory top-level folder, all team-shared roots (indeed all of the plurality of root directories associated with the organization account) should have a unique name to avoid confusing the members of the organization and to avoid potential path conflicts from attempting to mount two roots with the same name.

As addressed herein, the present technology provides a restriction on the creation of root directories for an organization account. Only administrators of the organization account and those with permissions delegated by an administrator have the privilege to create a root directory for the organization account. For example, an administrator can interact with the content management system 102 illustrated in FIG. 1 to provide, and the content management system 102 may receive a delegation of permission from an administrator of the organization directory top-level folder to permit the user account to create a team-shared root folder to be mounted under the organization directory top-level folder. In some embodiments, the administrator interacts with an admin console to delegate the permission.

As addressed in FIG. 4, the client application 136 can mount at least one root directory under the organization directory top-level folder, which can be accessible on client device 134. In some embodiments, the root directory can be accessible by interacting with a file explorer interface provided by an operating system of client device 134.

According to some examples, the method includes receiving an input in a contextual menu requesting to create a first team-shared root at block 506. For example, the client application 136 illustrated in FIG. 1 may receive an input in a contextual menu requesting to create a first team-shared root. For example, the contextual menu can accessed by right-clicking or other input applied with respect to the organization directory top-level folder. The contextual menu can include options that pertain to the client application 136, such as an option to create a new team-shared root. The team-shared roots are folders that are permitted to be mounted directly under the organization directory top-level folder.

Note that if a user of client device 134 attempts to create a new folder under the organization directory top-level folder using commands or inputs that are more generally available in the user interface of the operating system, the user will not be successful because the organization directory top-level folder is a read-only folder. The organization directory top-level folder can be configured as read-only in the operating system, and as such, the operating system should not permit the creation of any content item, including a team-shared root, under the organization directory top-level folder. And, if a user circumvents the read-only permissions in the operating system, the client synchronization service 138 also will not synchronize the content item created under the organization directory top-level folder, and in fact, client synchronization service 138 will delete or move the content items from the organization directory top-level folder.

In a technical sense, only the content management system 102 can create root directories under the organization directory top-level folder, and only administrators of the organization account and delegates of administrators have permission to instruct the content management system 102 to create root directories. This is why the user account needs to interact with the contextual menu; the contextual menu provides a request to create a new team-shared root via an API call to the content management system 102. In some embodiments, the selection of the option in the contextual menu can result in a presentation of a create folder modal.

Figure 6:
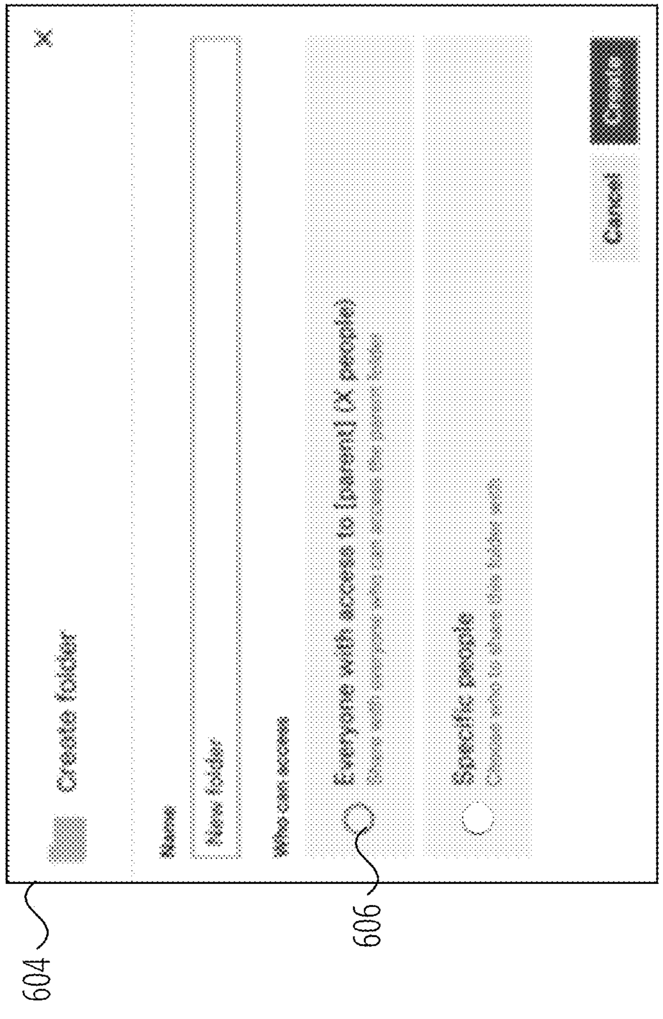
FIG. 6 illustrates an example of the create folder modal in accordance with some embodiments of the present technology.

FIG. 6 illustrates an example of the create folder modal 604 which is an interface provided by the content management system 102. The create folder modal 604 can include an option 606 to allow a user to create a folder within a parent folder. In some embodiments, the parent folder can be the organization directory top-level folder, assuming the user account has permission to do so.

According to some examples, the method includes determining whether the user account requesting to create the team-shared root has administrative privileges associated with an organization account at block 508. For example, the content management system 102 illustrated in FIG. 1 may determine whether the user account requesting to create the team-shared root has administrative privileges associated with an organization account. Privileges to create the team-shared roots are reserved for user accounts acting as an administrator for the organization account, or a delegate thereof.

If the user account does not have privileges to create a new team-shared root, the user account can be presented with an option to request that an administrator create the team-shared root.

If the user account does have privileges to create a new team-shared root, according to some examples, the method includes determining that a name of the first team-shared root is unique among a plurality of root directories already associated with the organization account at block 510. For example, the content management system 102 illustrated in FIG. 1 may determine that a name of the first team-shared root is unique among a plurality of root directories already associated with the organization account. Since the team-shared roots will be mounted under the organization directory top-level folder, all team-shared roots (indeed all of the plurality of root directories associated with the organization account) should have a unique name to avoid confusing the members of the organization and to avoid potential path conflicts from attempting to mount two roots with the same name.

The determination of whether the name of the first team-shared root is unique among a plurality of root directories already associated with the organization account includes the content management system 102 looking up all root directories associated with the organization account and confirming that the name of the first team-shared root is unique. Note that the root directories that are associated with the organization account can be greater than those that are associated with the user account (even if an administrator) and that are mounted for that user account. Thus, the user account creating the first team-shared root might not know that a team-shared root with the same name already exists.

In some embodiments, when there is a conflict between a name suggested for the first team-shared root and an existing root directory associated with the organization account, the content management system 102 can notify the user account and ask if they want to provide a new name or request to be given access to the existing team-shared root having the same name as that requested for the first team-shared root.

When the name of the first team-shared root is unique among other root directories associated with the organization account, according to some examples, the method includes creating the first team-shared root associated with the organization account at block 512. For example, the content management system 102 illustrated in FIG. 1 may create the first team-shared root associated with the organization account.

According to some examples, the method includes mounting the first team-shared root under the organization directory top-level folder at block 514. For example, content management system 102 can provide an instruction to the client synchronization service 138 illustrated in FIG. 1 to mount the first team-shared root under the organization account for the user account that requested the first team-shared root be created, and the client synchronization service 138 may mount the first team-shared root under the organization directory top-level folder.

Figure 7:
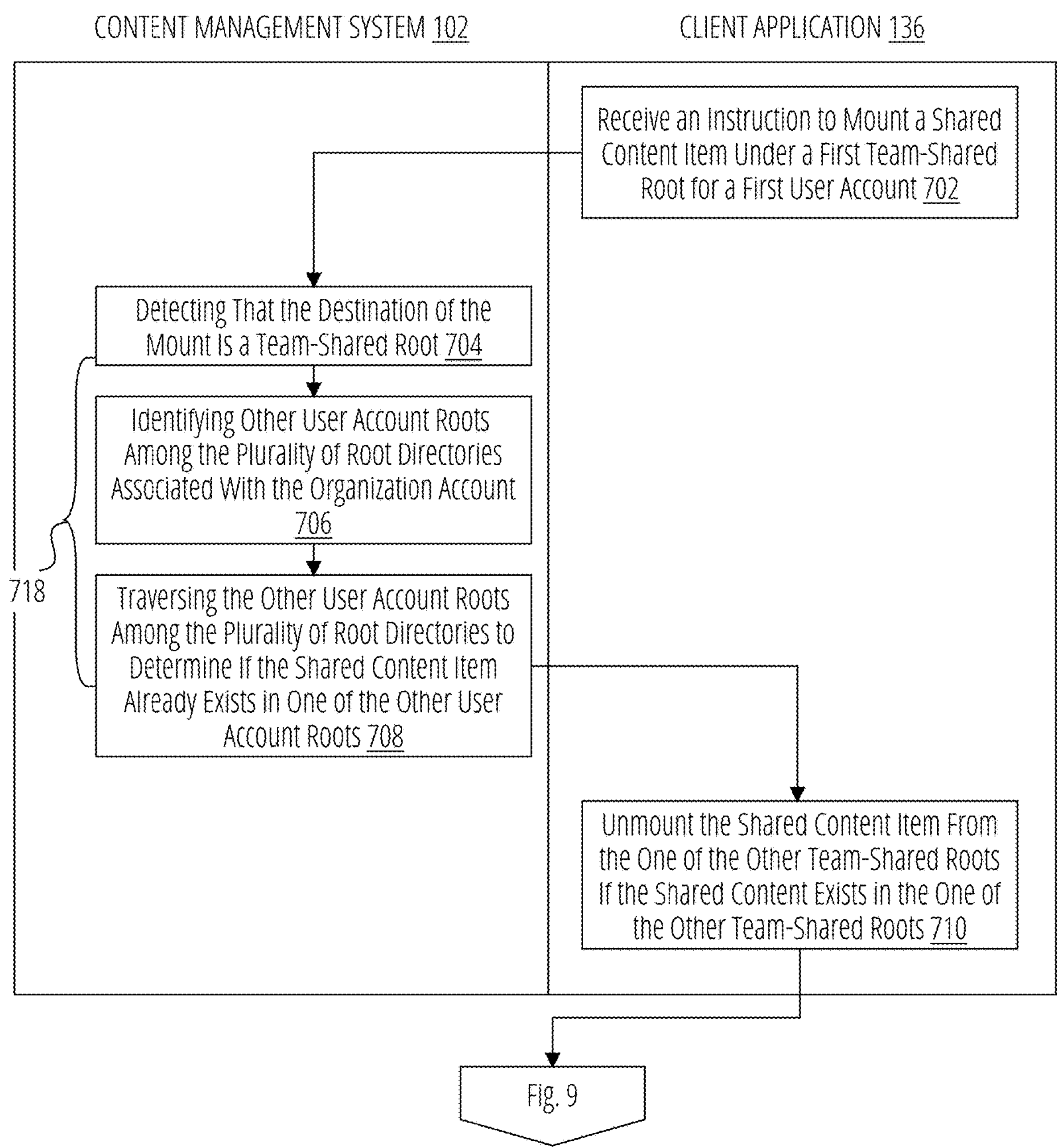
FIG. 7 illustrates an example routine for performing a duplicate mount detection process in accordance with some embodiments of the present technology.

FIG. 7 illustrates an example routine for performing a duplicate mount detection process in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. In some embodiments, the method addressed with respect to FIG. 7 is usable with the methods addressed with respect to FIG. 4, FIG. 5, and a combination thereof.

As addressed herein, a goal of the organization account is to provide user accounts associated with the organization with a consistent view of where content items are located in the directory structure. This goal of a consistent directory for the organization account therefore creates an additional complexity. That is the present technology needs to ensure that content items that are shared do not appear in a user's account in two different locations. Not only might having duplicate shared content items cause synchronization errors or at least redundancy, but this would also be likely to confuse a user. The second is that user accounts might need to be given access to a content item that is located under a root to which they do not have access. FIG. 7 addresses at least these complexities.

One context in which it might be possible (if not for the present technologies' duplicate mount detection process) to have a content item appear in two different locations in a user account's view of the organization directory is when a content item associated with the organization account is first shared from a path under a second user account root that is associated with the organization account (note that the first user account does not have access to any other user account root than their own), and later the first user account attempts to move the content item to be under another team-shared root. This is illustrated in FIG. 8A, FIG. 8B, FIG. 8C, and FIG. 8D. For example, as illustrated in FIG. 8A, a shared content item 802 can be shared under a mechanism that would make the shared content item 802 appear in the User 1 user account root 808 as if the shared content item 802 were any other shared content item from outside the organization. In such an embodiment, the shared content item 802 (which could be a folder, document, or other data item) would appear under the User 1 user account root 808 for that user account. This scenario is acceptable, because no other user account, such as User 2, sees the shared content item 802 in more than one place. In FIG. 8B, User 2 user account sees the shared content item 802 under their User 2 user account root 810. The User 1 user account would only see the shared content item 802 under their user account root 808 because they do not have access to the User 2 user account root 810 under which the shared content item 802 appears. But a problem can arise if the either User 1 user account or User 2 user account either gains access to shared content item 802 under another location associated with the organization. For example, if the User 1 user account attempts to move or copy the shared content item 802 from the location under their User 1 user account root 808 to be under a team-shared root (e.g., team-shared root 804 in FIG. 8C and FIG. 8D) such the other members of the organization might now see two versions of the content item. For example, as illustrated in FIG. 8D, User 2 user account ends up in an invalid state when User 1 user account has moved shared content item 802 into team-shared root 804 because now user 2 user account sees shared content item 802 both in User 2 user account root 810 and in the duplicate location under team-shared root 804.

According to some examples, the method includes receiving an instruction to mount a shared content item under a first team-shared root for a first user account at block 702.

For example, the client synchronization service 138 illustrated in FIG. 1 may receive an instruction to mount a shared content item 802 under a first team-shared root 804 for a first user account. The first team-shared root 804 is one of a plurality of root directories mounted under an organization directory top-level folder 302 associated with an organization account.

According to some examples, the method includes performing a duplicate mount detection process 718, which can include, but is not limited to block 704, block 706, and block 708. In some embodiments, the duplication duplicate mount detection process is carried out for each user account in the organization. In some embodiments, the duplicate mount detection process is carried out for each user account gaining access to the shared content item 802 under the first team-shared root 804.

According to some examples, the method includes detecting that the destination of the mount is a team-shared root at block 704. For example, the content management system 102 illustrated in FIG. 1 may detect that the destination of the mount is team-shared root 804. This is accomplished by crawling up a path from the mount location for shared content item 802 to the root of the directory, which is team-shared root 804, and identifying that it is a root associated with the organization account.

According to some examples, the method includes identifying other user account roots among the plurality of root directories associated with the organization account at block 706. For example, the content management system 102 illustrated in FIG. 1 may identify other user account roots (e.g., such as User 2 user account root 810) among the plurality of root directories associated with the organization account. In some embodiments, it is not necessary to traverse other team shared roots because it is a property of the team-shared roots that all items under the team shared roots much be unique, which prevents duplicate mounts.

According to some examples, the method includes traversing the other user account roots among the plurality of root directories to determine if the content item already exists in one of the other user account roots at block 708. For example, the content management system 102 illustrated in FIG. 1 may traverse the other user account roots among the plurality of root directories to determine if the shared content item 802 already exists in one of the other user account roots (e.g., does shared content item 802 exist in User 2 user account root 810 or another user account root).

According to some examples, the method includes unmounting the shared content item 802 from one of the user account roots if the shared content item 802 exists in one of the other user account roots at block 710. For example, the client synchronization service 138 illustrated in FIG. 1 may unmount the shared content item 802 from User 2 user account root 810. The shared content item 802 should be unmounted from the user account root (e.g. User 2 user account root 810) since now shared content item 802 is accessible to other members associated with the organization account. But, scenarios could exist where the appropriate action would be to unmount shared content item 802 from the team shared folder and restore the shared content item 802 back to its original location.

When the shared content item 802 is unmounted, say from User 2 user account root 810, the User 2 user account can receive a notification informing them that the shared content item 802 remains accessible to them in team-shared root 804 or that they have been given limited access to team-shared root 804 in order to access shared content item 802 at its proper location in the organization directory. This limited access is a traversal right and is addressed with respect to FIG. 9, below.

Figure 9:
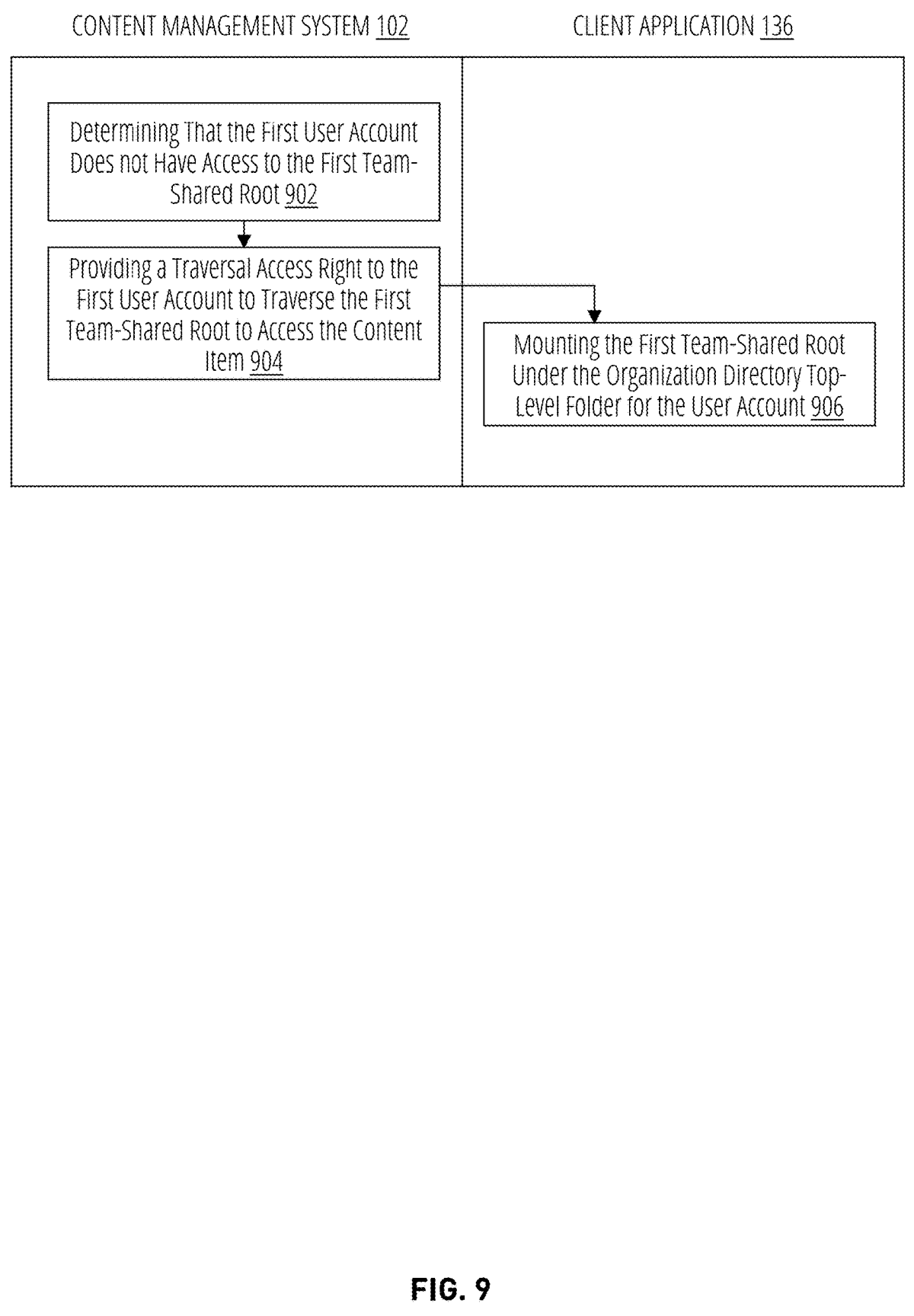

FIG. 9 illustrates an example routine for providing a traversal right to a user account to access a content item under a team-shared root to which they do not have access in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. In some embodiments, the method addressed with respect to FIG. 9 is usable with the methods addressed with respect to FIG. 4, FIG. 5, FIG. 7 and a combination thereof.

As addressed herein, a goal of the organization account is to provide user accounts associated with the organization with a consistent view of where content items are located in the directory structure. However, sometimes a user account will need access to a content item that is under a team-shared root to which they do not otherwise have access.

According to some examples, the method includes determining that the first user account does not have access to the first team-shared root, but that the first user account has been given access to a content item located under the first team-shared root at block 902. For example, the content management system 102 illustrated in FIG. 1 may determine that the first user account does not have access to the first team-shared root.

According to some examples, the method includes providing a traversal access right to the first user account to traverse the first team-shared root to access the content item under the first team-shared root at block 904. For example, the content management system 102 illustrated in FIG. 1 may provide a traversal access right to the first user account to traverse the first team-shared root to access the content item.

The traversal right can be an explicit access right written into an access control list for the first team-shared root, and subordinate folders in the path to the content item inherit the traversal access permissions from the first team-shared root. The traversal access permits the first user account to see the name of folders in a path to the content item, and to traverse the folders in the path to the content item, but the folders in the path to the content item appear empty.

Note, that in some embodiments, the traversal right is applied to the team-shared root, which means that the traversal right can apply to a root directory that has no other parent.

According to some examples, the method includes mounting the team-shared root for which the user account has been given a traversal right under the organization directory top-level folder for the user account at block 906. For example, the client synchronization service 138 illustrated in FIG. 1 may receive an instruction from content management system 102 to mount the team-shared root, and the client synchronization service 138 can mount the team-shared root under the organization directory top-level folder for the first user account. The nodes in the directory under the team-shared root for which the user account has been granted traversal rights will inherit these traversal rights down a directory path, until a location in the directory for which the user account has been granted read or read-write access.

Figure 10:
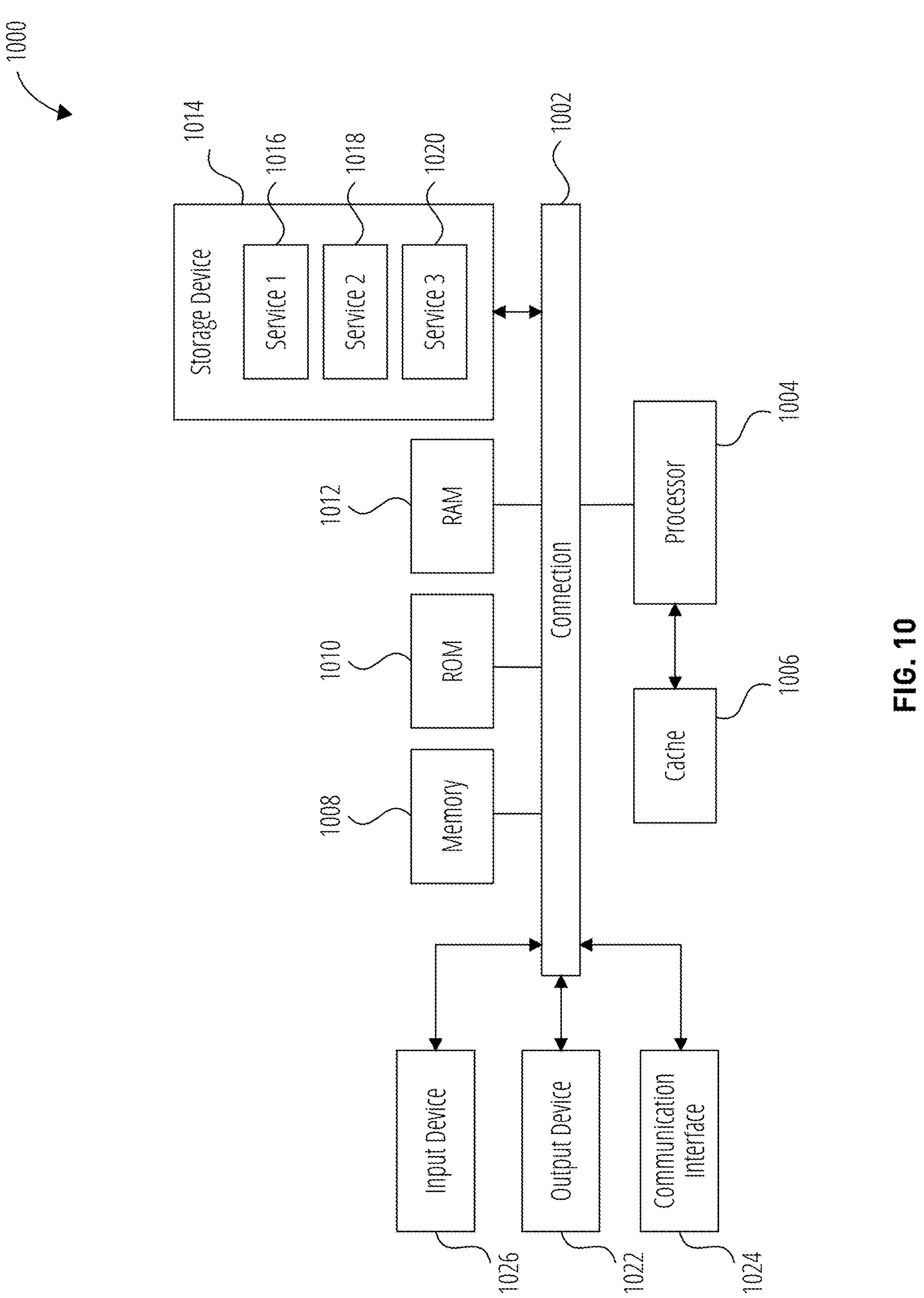
FIG. 10 shows an example of a system for implementing some embodiments of the present technology.

FIG. 10 shows an example of computing system 1000, which can be for example any computing device making up content management system 102, client application 136, or any component thereof in which the components of the system are in communication with each other using connection 1002. Connection 1002 can be a physical connection via a bus, or a direct connection into processor 1004, such as in a chipset architecture. Connection 1002 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Computing system 1000 can include a cache of high-speed memory 1006 connected directly with, in close proximity to, or integrated as part of processor 1004.

Processor 1004 can include any general purpose processor and a hardware service or software service, such as services 1016, 1018, and 1020 stored in storage device 1014, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

Storage device 1014 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1014 can include software services, servers, services, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Clause 1. A method for generating an organization directory top-level folder, the method comprising: maintaining a plurality of root directories at a content management system the plurality of root directories are associated with an organization; creating an organization directory top-level folder on a client device having a content management system client application executing thereon, wherein the user account has read only access to the organization directory top-level folder and the content management system client application has write permission to the organization directory top-level folder; mounting the plurality of root directories under the organization directory top-level folder in a first user account and a second user account, wherein the organization directory top-level folder is a construct respectively generated for the first user account and the second user account, that provides a respective user account view of the organization directory top-level folder, the respective user account view of the organization directory top-level folder enforces the appearance of a consistent view for any of the team-shared roots displayed in the respective user account view of the organization directory top-level folder; wherein the organization directory top-level folder does not exist as a directory in the content management system; and providing a view of the organization directory top-level folder in the first user account and the second user account, whereby the first user account and the second user account view the plurality of root directories as if they existed in a common organization directory.

Clause 2. The method of clause 1, wherein the plurality of root directories includes a first user account root, and a second user account root, and the mounting of the plurality of root directories includes mounting the first user account root to the organization directory top-level folder for the first user account, and the second user account root to the organization directory top-level folder for the second user account, whereby the second user account root only appears in the organization directory top-level folder for the second user account and does not appear in the organization directory top-level folder for the first user account, whereby the first user account root only appears in the organization directory top-level folder for the first user account and does not appear in the organization directory top-level folder for the second user account.

Clause 3. The method of clause 1, further comprising: receiving a request to create a team-shared root; determining whether the user account requesting to create the team-shared root has an administrative privilege associated with an organization account, wherein the administrative privilege to create the team-shared roots is reserved to user accounts acting as an administrator for the organization account, wherein the team-shared roots are folders that are permitted to be mounted directly under the organization directory top-level folder; and creating the team-shared root when the user account requesting to create the team-shared root has the administrative privilege associated with the organization account.

Clause 4. The method of clause 3, further comprising: prior to creating the team-shared root, determining that a name of the team-shared root is unique among the plurality of root directories.

Clause 5. The method of clause 1, further comprising: determining a change that adds or removes a first team-shared root from association with the organization account; updating permission to the first team-shared root for user accounts associated with the organization account in a membership database; propagating the change to the first team-shared root to the respective user account view of the organization directory top-level folder for the respective user account, whereby the first team-shared root is added or removed from the respective user account view of the organization directory top-level folder for the respective user account.

Clause 6. The method of clause 1, further comprising: determining a subset of the plurality of root directories to mount in the organization directory top-level folder for a first user account, wherein the plurality of root directories includes a first team-shared root, a second team-shared root, and a user account root, wherein the determining which of the subset of the plurality of root directories to mount in the organization directory top-level folder for the first user account includes identifying that the first user account has access to at least one content item within a directory structure of the first team-shared root but not the second team-shared root, wherein the first team-shared root is mounted as part of the mounting the plurality of root directories under the organization directory top-level folder in a first user account, and the second team-shared root is not mounted as part of the mounting the plurality of root directories under the organization directory top-level folder in a first user account.

Clause 7. The method of clause 1, further comprising: receiving a change in access by the first user account, wherein the first user account gains access to a content item; determining that the first content item is located within a first team-shared root, but the first user account does not have access to the first team-shared root, wherein an access propagator service crawls up a path from the content item until it identifies a root of the path, which is the first team-shared root; providing a traversal access right to the first user account to traverse the first team-shared root to access the content item, wherein the traversal access permits the first user account to see the name of folders in a path to the content item, and to traverse the folders in the path to the content item, but the folders in the path to the content item appear empty, wherein a traversal access right is written into an access control list for the first team-shared root, and subordinate folders in the path to the content item inherit the traversal access permissions from the first team-shared root.

Clause 8. The method of clause 1, wherein an administrator of the organization directory top-level folder has delegated permission to the user account to create a team-shared root folder to be mounted under the organization directory top-level folder.

Clause 9. The method of clause 8, wherein the administrator interacts with an admin console to delegate the permission.

Clause 10. The method of clause 8, further comprising: receiving an input in a contextual menu requesting to create a first team-shared root; after receiving the input in the contextual menu, creating the first team-shared root associated with the organization account; and mounting the first team-shared root under the organization directory top-level folder.

Clause 11. The method of clause 10, further comprising: prior to creating the first team-shared root, determining that a name of the first team-shared root is unique among a plurality of root directories already associated with the organization account.

Clause 12. The method of clause 1, further comprising: receive an instruction to mount a content item under a first team-shared root for a first user account, wherein the first team-shared root is one of a plurality of root directories mounted under an organization directory top-level folder associated with an organization account; prior to mounting the content item, performing a duplicate mount detection process, the duplicate mount detection process comprising: detecting that the destination of the mount is a team-shared root by crawling up a path from the mount location of the content item to identify a root of the path to which it is being mounted, which is the first team-shared root; identifying other team-shared roots among the plurality of root directories associated with the organization account; traversing the other team-shared roots among the plurality of root directories to determine if the content item already exists in one of the other team-shared roots; unmount the content item from the one of the other team-shared roots if the content item exists in the one of the other team-shared roots; and mounting the content item under the first team-shared root.

Clause 13. The method of clause 12, further comprising: determining that the first user account does not have access to the first team-shared root; providing a traversal access right to the first user account to traverse the first team-shared root to access the content item, wherein the traversal access permits the first user account to see the name of folders in a path to the content item, and to traverse the folders in the path to the content item, but the folders in the path to the content item appear empty, wherein a traversal access right is written into an access control list for the first team-shared root, and subordinate folders in the path to the content item inherit the traversal access permissions from the first team-shared root.

Clause 14. The method of clause 12, wherein the duplicate mount detection process is carried out for each user account gaining access to the content item under the first team-shared root.

Clause 15. The method of clause 1, further comprising: prior to mounting a first team-shared root performing a duplicate mount detection process, the duplicate mount detection process comprising: identifying a user account root associated with the organization account and the user account to which the first team-shared root is to be mounted; traversing the user account root to determine if any folder that is subordinate to the first team-shared root already exists in the user account root; unmount folder that is subordinate to the first team-shared root from the user account root if the folder exists in the user account root; and mounting the first team-shared root to the organization directory top-level folder for the user account.

What is claimed is:

1. A method for generating a top-level folder of an organization directory, the method comprising:

maintaining a plurality of root directories at a content management system, the plurality of root directories corresponding to separate directory structures associated with an organization account at the content management system;

mounting the plurality of root directories corresponding to the separate directory structures under the top-level folder of the organization directory in a first user account and a second user account, wherein the top-level folder of the organization directory contains a subset of the plurality of root directories mounted therein, and does not directly contain content items; and providing a view of the top-level folder of the organization directory in the first user account and the second user account, whereby the first user account and the second user account view the plurality of root directories under the top-level folder as if they existed in a common organization directory.

2. The method of claim 1, wherein:

the plurality of root directories comprises a first user account root and a second user account root; and mounting the plurality of root directories comprises mounting the first user account root to the top-level folder of the organization directory for the first user account and mounting the second user account root to the top-level folder of the organization directory for the second user account.

3. The method of claim 1, further comprising:

receiving a request to create a team-shared root;

determining whether the first user account requesting to create the team-shared root has an administrative privilege associated with the organization account, wherein the administrative privilege to create the team-shared root is reserved to user accounts acting as an administrator for the organization account; and creating the team-shared root in response to determining that the first user account acts as an administrator for the organization account.

4. The method of claim 3, further comprising:

prior to creating the team-shared root, determining that a name of the team-shared root is unique among the plurality of root directories.

5. The method of claim 1, further comprising:

determining a change that adds or removes a first team-shared root from association with the organization account;

updating permissions to the first team-shared root for user accounts associated with the organization account in a membership database; and propagating the change to the first team-shared root to a respective user account view of the top-level folder of the organization directory for a respective user account.

6. The method of claim 1, further comprising:

determining, for a first user account, a subset of the plurality of root directories to mount in the top-level folder of the organization directory, wherein:

the plurality of root directories comprises a first team-shared root, a second team-shared root, and a user account root;

determining the subset of the plurality of root directories comprises identifying that the first user account has access to at least one content item within a directory structure of the first team-shared root but not the second team-shared root; and mounting the plurality of root directories comprises mounting the first team-shared root under the top-level folder of the organization directory in a first user account, and not mounting the second team-shared root under the top-level folder of the organization directory in the first user account.

7. The method of claim 1, further comprising:

receiving a change in access by the first user account, wherein the first user account gains access to a content item;

determining that the first content item is located within a first team-shared root and that the first user account does not have access to the first team-shared root; and providing a traversal access right to the first user account to traverse the first team-shared root to access the content item, wherein the traversal access right permits the first user account to see names of folders that appear empty in a path to the content item and traverse the folders that appear empty in the path to the content item.

8. The method of claim 1, further comprising:
receiving an input in a contextual menu requesting to create a first team-shared root;
creating, in response to receiving the input, the first team-shared root associated with the organization account; and
mounting the first team-shared root under the top-level folder of the organization directory.

9. The method of claim 1, further comprising:
receiving an instruction to mount a content item under a first team-shared root of the plurality of root directories for the first user account; and
prior to mounting the content item, performing a duplicate mount detection process comprising:
detecting that a destination of a mount is a team-shared root;
identifying other user account roots of the plurality of root directories associated with the organization account,
traversing the other user account roots of the plurality of root directories to determine if the content item already exists in a user account root of the other user account roots, and
unmounting, in response to determining that the content item exists in the user account root, the content item from the user account root.

10. The method of claim 9, further comprising:
determining that a user account associated with the user account root does not have access to the first team-shared root; and
providing a traversal access right to the user account to traverse the first team-shared root to access the content item, wherein the traversal access right permits the user account associated with the other user account roots to see names of folders that appear empty in a path to the content item, and to traverse the folders that appear empty in the path to the content item.

11. The method of claim 9, further comprising performing the duplicate mount detection process for each user account associated with the organization account.

12. The method of claim 1, further comprising:
prior to mounting a first team-shared root performing a duplicate mount detection process comprising:
identifying a user account root associated with the organization account and the first user account to which the first team-shared root is to be mounted;
traversing the user account root to identify folders that are subordinate to the first team-shared root and already exist in the user account root;
unmounting a folder of the folders in response to determining that the folder already exists in the user account root; and
mounting the first team-shared root to the top-level folder of the organization directory for the first user account.

13. A computing system comprising:
at least one processor; and
a memory storing instructions that, when executed by the at least one processor, cause the computing system to:
maintain a plurality of root directories at a content management system, the plurality of root directories corresponding to separate directory structures associated with an organization account at the content management system;
mount the plurality of root directories corresponding to the separate directory structures under a top-level folder of an organization directory in a first user account and a second user account,
wherein the top-level folder of the organization directory contains a subset of the plurality of root directories mounted therein and does not directly contain content items-level folder; and
provide a view of the top-level folder of the organization directory in the first user account and the second user account, whereby the first user account and the second user account view the plurality of root directories under the top-level folder as if they existed in a common organization directory.

14. The computing system of claim 13, wherein:
the plurality of root directories comprises a first user account root and a second user account root; and
mounting the plurality of root directories comprises mounting the first user account root to the top-level folder of the organization directory for the first user account and mounting the second user account root to the top-level folder of the organization directory for the second user account.

15. The computing system of claim 13, wherein the instructions further configure the computing system to:
receive a request to create a team-shared root;
determine whether the first user account requesting to create the team-shared root has an administrative privilege associated with the organization account, wherein the administrative privilege to create the team-shared root is reserved to user accounts acting as an administrator for the organization account; and
create the team-shared root in response to determining that the first user account acts as an administrator for the organization account.

16. The computing system of claim 15, wherein the instructions further cause the computing system to:
prior to creating the team-shared root, determine that a name of the team-shared root is unique among the plurality of root directories.

17. The computing system of claim 13, wherein the instructions further cause the computing system to:
receive a change in access by the first user account, wherein the first user account gains access to a content item;
determine that the content item is located within a first team-shared root and that the first user account does not have access to the first team-shared root; and
provide a traversal access right to the first user account to traverse the first team-shared root to access the content item, wherein the traversal access right permits the first user account to see names of folders that appear empty in a path to the content item and traverse the folders that appear empty in the path to the content item.

18. The computing system of claim 13, wherein the instructions further cause the computing system to:
prior to mounting a first team-shared root, perform a duplicate mount detection process comprising:
identifying a user account root associated with the organization account and the first user account to which the first team-shared root is to be mounted;
traversing the user account root to identify folders that are subordinate to the first team-shared root and already exist in the user account root;
unmounting a folder of the folders in response to determining that the folder already exists in the user account root; and mounting the first team-shared root to the top-level folder of the organization directory for the first user account.

19. A non-transitory computer-readable storage medium comprising instructions stored thereon that when executed by at least one processor, cause the at least one processor to:

maintain a plurality of root directories at a content management system, the plurality of root directories corresponding to separate directory structures associated with an organization account at the content management system;

create a top-level folder of an organization directory on a client device having a content management system client application executing thereon, wherein the content management system client application has write permission to the top-level folder of the organization directory;

mount the plurality of root directories corresponding to the separate directory structures under the top-level folder of the organization directory in a first user account and a second user account, wherein the top-level folder of the organization directory does not exist as a directory in the content management system; and provide a view of the top-level folder of the organization directory in the first user account and the second user account, whereby the first user account and the second user account view the plurality of root directories under the top-level folder as if they existed in a common organization directory.

20. The non-transitory computer-readable storage medium of claim 19, wherein;

the plurality of root directories comprises a first user account root and a second user account root; and mounting the plurality of root directories comprises mounting the first user account root to the top-level folder of the organization directory for the first user account and mounting the second user account root to the top-level folder of the organization directory for the second user account.

* * * * *